United States Patent
Drouhard

(10) Patent No.: US 8,061,281 B1
(45) Date of Patent: Nov. 22, 2011

(54) GARDEN SEEDER

(76) Inventor: Rex B. Drouhard, Newton, KS (US)

( * ) Notice: Subject to any disclaimer, the term of this patent is extended or adjusted under 35 U.S.C. 154(b) by 100 days.

(21) Appl. No.: 12/558,691

(22) Filed: Sep. 14, 2009

(51) Int. Cl.
- *A01C 5/00* (2006.01)
- *A01C 7/00* (2006.01)
- *A01C 7/18* (2006.01)
- *A01C 9/00* (2006.01)

(52) U.S. Cl. .......................................... 111/36; 111/171

(58) Field of Classification Search .......... 111/170–172, 111/34, 36, 901; 221/211; 222/415, 185
See application file for complete search history.

(56) References Cited

U.S. PATENT DOCUMENTS

| | | |
|---|---|---|
| 2,082,688 A | 6/1937 | Dekker |
| 3,788,518 A | 1/1974 | Beebe |
| 3,917,471 A | 11/1975 | Becker |
| 4,514,114 A | 4/1985 | Fuss et al. |
| 4,522,340 A | 6/1985 | Gandrud |
| D284,667 S | 7/1986 | Bliskey et al. |
| 5,189,965 A | 3/1993 | Hobbs |
| 5,359,948 A | 11/1994 | Makkink |
| 5,402,741 A | 4/1995 | Truax et al. |
| 5,542,364 A | 8/1996 | Romans |
| 5,601,209 A | 2/1997 | Barsi et al. |
| 5,944,264 A | 8/1999 | Truax et al. |
| 6,564,729 B1 | 5/2003 | Petzoldt |
| 6,619,219 B2 | 9/2003 | Choi et al. |

FOREIGN PATENT DOCUMENTS

| | | |
|---|---|---|
| GB | 2025742 | 1/1980 |
| JP | 10080207 | 3/1998 |

*Primary Examiner* — Christopher J. Novosad
(74) *Attorney, Agent, or Firm* — Davis & Jack, L.L.C.; Kenneth H. Jack

(57) ABSTRACT

A garden seeder having a seed bin; a seed wheel having a plurality of circumferentially attached seed dispensing cups; a first axle mounting the seed wheel within the seed bin for orbital movements of the seed cups through scooping and dispensing positions; a ground wheel; a second axle mounting the ground wheel upon the seed bin; a Geneva drive connecting the seed wheel to the ground wheel for translating rotation of the ground wheel to intermittent orbital motions of the seed dispensing cups through the seed scooping and seed dispensing positions; and a handle connected operatively to the seed bin.

23 Claims, 7 Drawing Sheets

GARDEN SEEDER

FIELD OF THE INVENTION

This invention relates to gardening machinery and equipment. More particularly, this invention relates to such machinery which is adapted for planting of seeds within gardens.

BACKGROUND OF THE INVENTION

Common push drive or manually driven rolling garden seeders are known to be adapted for dispensing seeds at selective and varying intervals along a seed planting furrow. However, structural reconfigurations of such seeders which are typically necessary for altering seeder's seed planting intervals are typically mechanically complex, and are cumbersome. For example, in one such known rolling garden seeder, mechanical detachment and withdrawal of a first seed dispensing wheel, followed by mechanical interchange of a different seed dispensing wheel is undesirably required in order to alter the seeder's seed planting interval.

The instant inventive garden seeder solves or ameliorates problems and deficiencies discussed above which are confronted upon use of common mechanical seeders by incorporating within a wheeled garden seeder specialized structures including a variably driveable geneva drive having a seed dispensing wheel output.

BRIEF SUMMARY OF THE INVENTION

A first structural component of the instant inventive garden seeder comprises a seed bin having an upper seed storing end, and having a lower seed dispensing end. Preferably, the lower seed storing end of the seed bin comprises a concave or arcuately curved floor for facilitating seed accumulation at the bin's lower end, and for facilitating orbital motions thereover of a series of rotatably mounted seed cups.

The seed dispensing end of the seed bin preferably is configured to include a seed outlet port extending through one of the seed bin's walls, preferably a rear wall. In a preferred embodiment, the seed bin incorporates and includes structural frame members which underlie and support the seed bin at its floor, and which further provide convenient structural attachment points for support of other garden seeder components which are discussed below.

A further component of the instant inventive garden seeder comprises a seed wheel having a plurality or series of circumferentially attached seed dispensing cups. Preferably, the seed wheel is configured to present a series of evenly spaced and radially outwardly extending cup supporting spokes or arms. In a preferred embodiment, four of such arms are presented upon the seed wheel, and a seed dispensing cup is preferably fixedly attached at a distal end of each of said arms. Suitably, though less desirably, the seed wheel may present three of such arms with three distally attached seed dispensing cups. Also suitably, and also less desirably, the seed wheel may present five of such arms with five distally attached seed dispensing cups. In a preferred embodiment, the seed dispensing cups are removably attached in order to facilitate convenient removal of the seed cups and reattachment of cups having differing sizes or interior seed carrying volumes.

A further structural component of the instant inventive garden seeder comprises a first axle which rotatably mounts the seed wheel within the interior space of the seed bin. The first axle preferably is positioned and laterally oriented within the seed bin for facilitating orbital movements of the seed dispensing cups through seed dispensing and seed scooping positions. The seed scooping positions preferably extend through seeds stored within the seed bin. Continued orbital motions of the seed cups along their paths which include the seed scooping positions extends the cups through the seed dispensing positions which overlie the stored seeds. Passage through the seed dispensing positions advantageously carries, throws, or drops seeds toward or at the seed bin's outlet port.

A further structural component of the instant inventive garden seeder comprises a ground wheel and a second axle which rotatably mounts the ground wheel upon the seed bin. The second axle is preferably rotatably supported upon the seed bin by double shear bearings mounted or positioned at the seed bin's underlying frame members.

A further structural component of the instant inventive garden seeder comprises a geneva drive which operatively interconnects the ground wheel and the seed wheel for intermittent rotating motion of the seed wheel. The geneva drive is preferably adapted for, upon manually driven rolling carriage of the garden seeder over a garden's surface, translating relatively continuous rotation of the ground wheel to the intermittent rotation of the seed wheel. Such intermittent rotation of the seed wheel advantageously results in commensurate intermittent orbital motions of the seed dispensing cups through the seed scooping positions and the seed dispensing positions. Driving means, preferably in the form of a push handle, are fixedly mounted to the seed bin, the driving means allowing a gardener to rollably move the inventive garden seeder over a garden's ground surface for seeding the garden. Other driving means such as a garden tractor trailering hitch are considered to fall within the scope of the invention.

In a preferred embodiment of the instant inventive garden, the geneva drive element comprises a combination of an input wheel and a slotted output wheel. Preferably, the geneva drive's slotted output wheel is mounted externally to the seed bin and upon an outward extension of the first axle. The mechanical linkage between the geneva drive's output and input wheels preferably comprises a plurality of drive pins, each drive pin preferably being fixedly and removably or interchangeably attached to the input wheel. The geneva drive's input wheel preferably comprises or is one and the same as the ground wheel. However, the geneva drive input wheel may suitably alternatively constitute a wheel which is separate from the ground wheel. Rotation of the ground wheel may be suitably translated to the input wheel by means of a gear train, a pulley and belt combination, a chain and sprocket combination, or a friction wheel train.

The instant inventive garden seeder preferably further comprises drive pin mounting means which are adapted for facilitating the preferred removable and interchangeable attachment of the drive pins to the ground wheel. In a preferred embodiment, the drive pin mounting means comprises a series of internally helically threaded pin mounting sockets which are arrayed peripherally about the ground wheel's hub. Such preferred pin mounting means advantageously provides for variability in the rotating frequency of contacts between the drive pins and the geneva drive's output wheel.

Where the seed wheel presents, as preferred, four radially outwardly extending arms, the geneva drive's output wheel preferably commensurately presents four drive pin receiving slots. Where the seed wheel presents a fewer or greater number of arms, the geneva drive's output wheel preferably presents a corresponding number of drive pin receiving slots.

In operation of the instant inventive garden seeder, and assuming the provision of preferred structures and components as described above, a gardener may initially threadedly mount a series of geneva drive output wheel engaging drive pins upon the geneva drive input wheel/ground wheel. Such pins are preferably mounted at radially spaced intervals which corresponding to a desired seed spacing interval. Where, for example, the ground wheel has a 24" circumference, and where the gardener desires to plant seeds at regular 12" intervals, drive pins may be mounted upon the ground wheel at 180° intervals. Such ground wheel/input wheel drive pin configuration results in a pin contact with one of the slots of the geneva drive's output wheel upon every 12" of rolling motion by the ground wheel. The geneva drive's output wheel simultaneously causes the seed wheel to orbitally move one of its four seed cups through a seed dispensing position upon every 12" of the rolling motion of the ground wheel. Thus, the 180° positioning of a pair of drive pins upon the ground wheel advantageously results in regular seed dispensation upon every 12" of rolling motion of the garden seeder along the garden's ground surface.

Threaded drive pin receiving sockets selectively positioned upon such 24" ground wheel at regular radial intervals selected from 30°, 60°, 90°, 120°, 180°, and 360°, advantageously facilitates corresponding 3", 4", 6", 8", 12", and 24" seed planting intervals. Ground wheels having different circumferences and/or differing angular placements of drive pins thereabout are considered to fall within the scope of the invention.

Accordingly, objects of the instant invention include the provision of a mechanical garden seeder which incorporates structures as described above, and which arranges those structures in the manners described above for the performance of above described beneficial functions.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
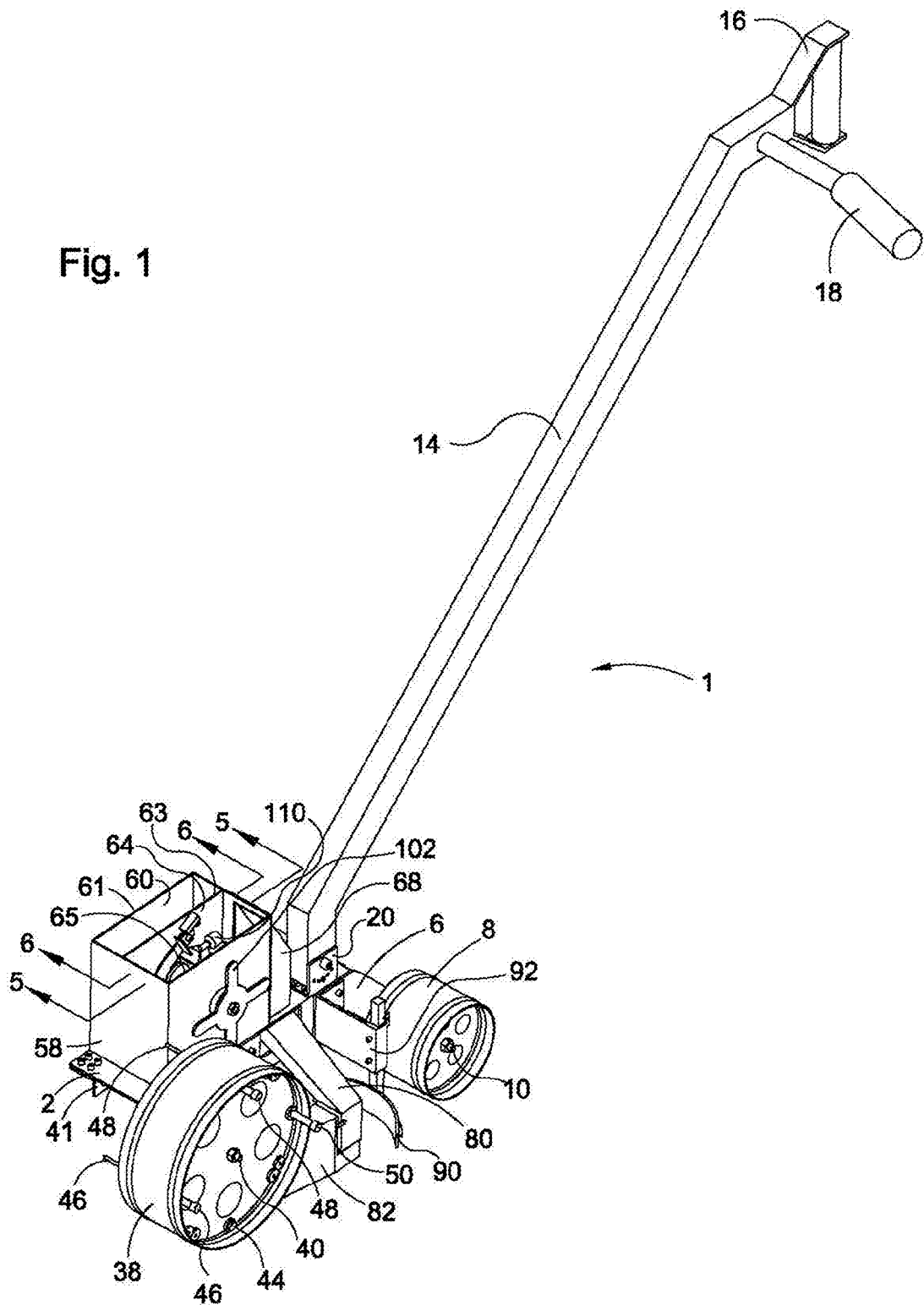
FIG. 1 is a perspective view of a preferred embodiment of the instant inventive garden seeder.
Figure 2:
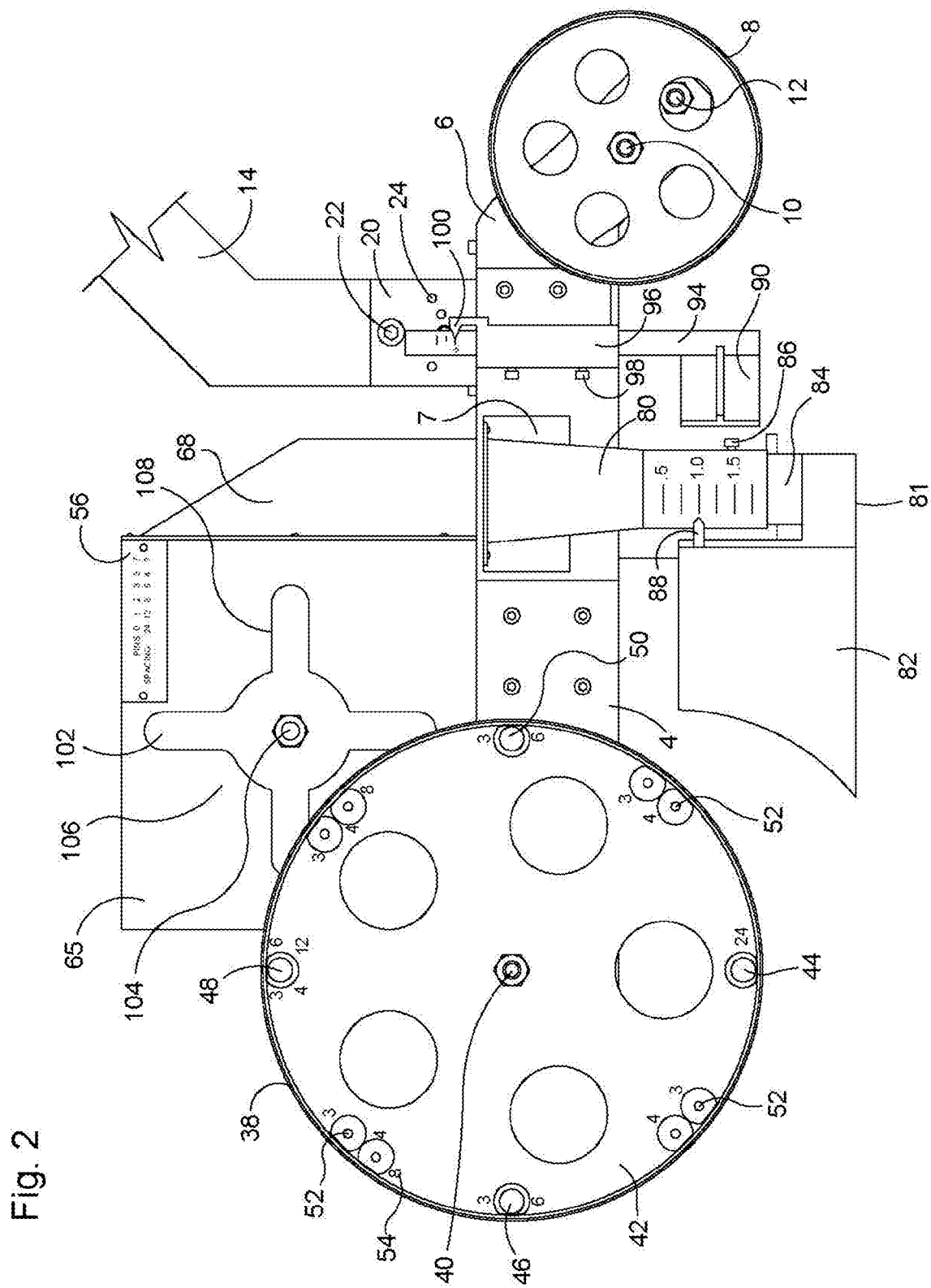
FIG. 2 is a partial left side view of the garden seeder of FIG. 1.
Figure 5:
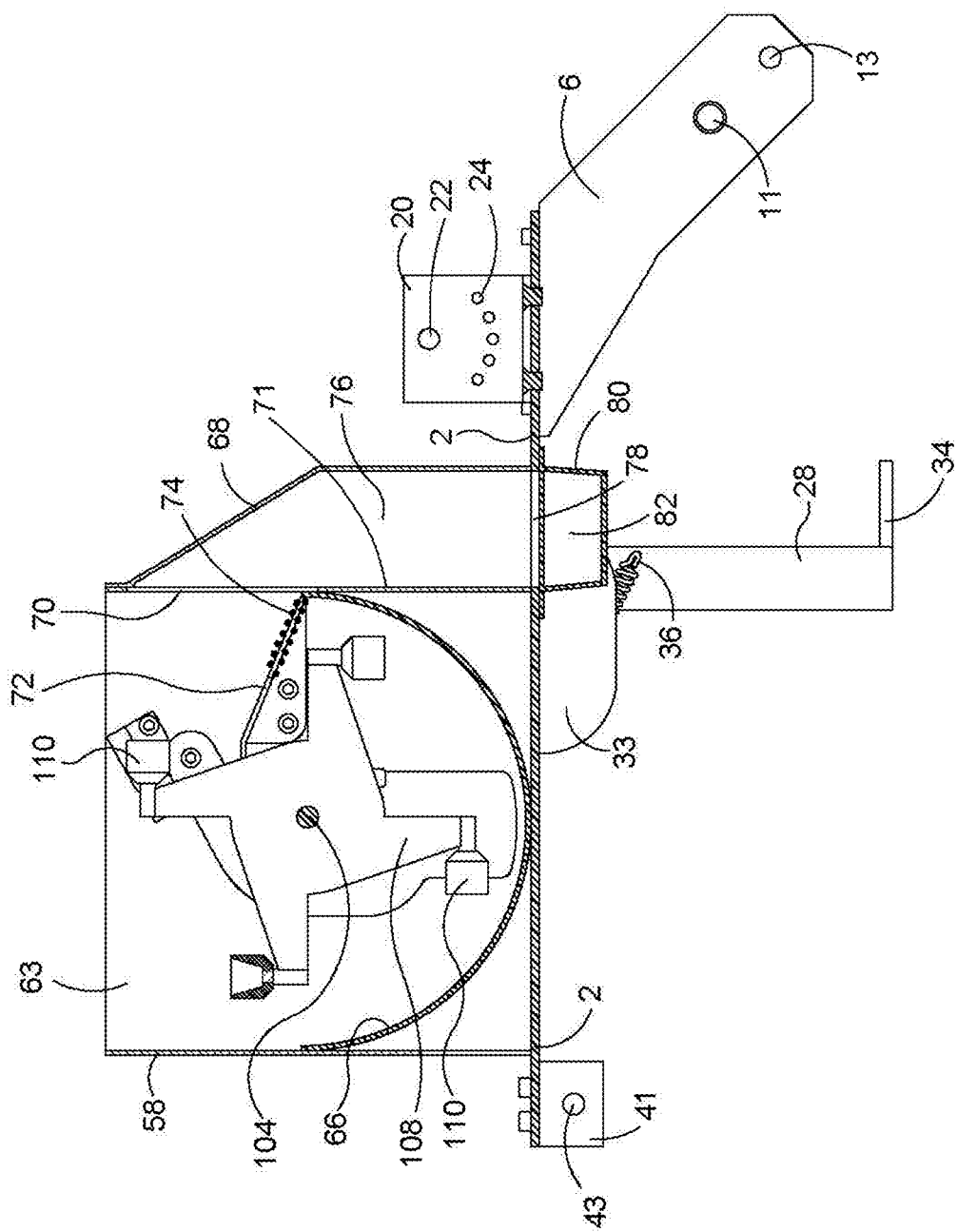
FIG. 5 is a partial sectional view as indicated in FIG. 1.

Referring now to the drawings, and in particular to FIG. 1, a preferred embodiment of the instant inventive garden seeder is referred to generally by Reference Arrow 1. The garden seeder has a seed bin which preferably includes a front wall 58, a left wall 65, and a right wall 63. Referring further to FIG. 5, the seed bin preferably further comprises a rear wall 71 and an arcuately curved seed collection floor 66. Preferably, the seed bin has an upper opening, and has an upwardly and rearwardly positioned seed outlet port 70 extending through the rear wall 71. Referring further simultaneously to FIG. 2, the instant invention's seed bin preferably further comprises frame members 2, 4, and 6 which provide structural support to the overlying bin wall structures, and which provide for structurally sufficient attachments of other seeder components which are discussed below.

Figure 7:
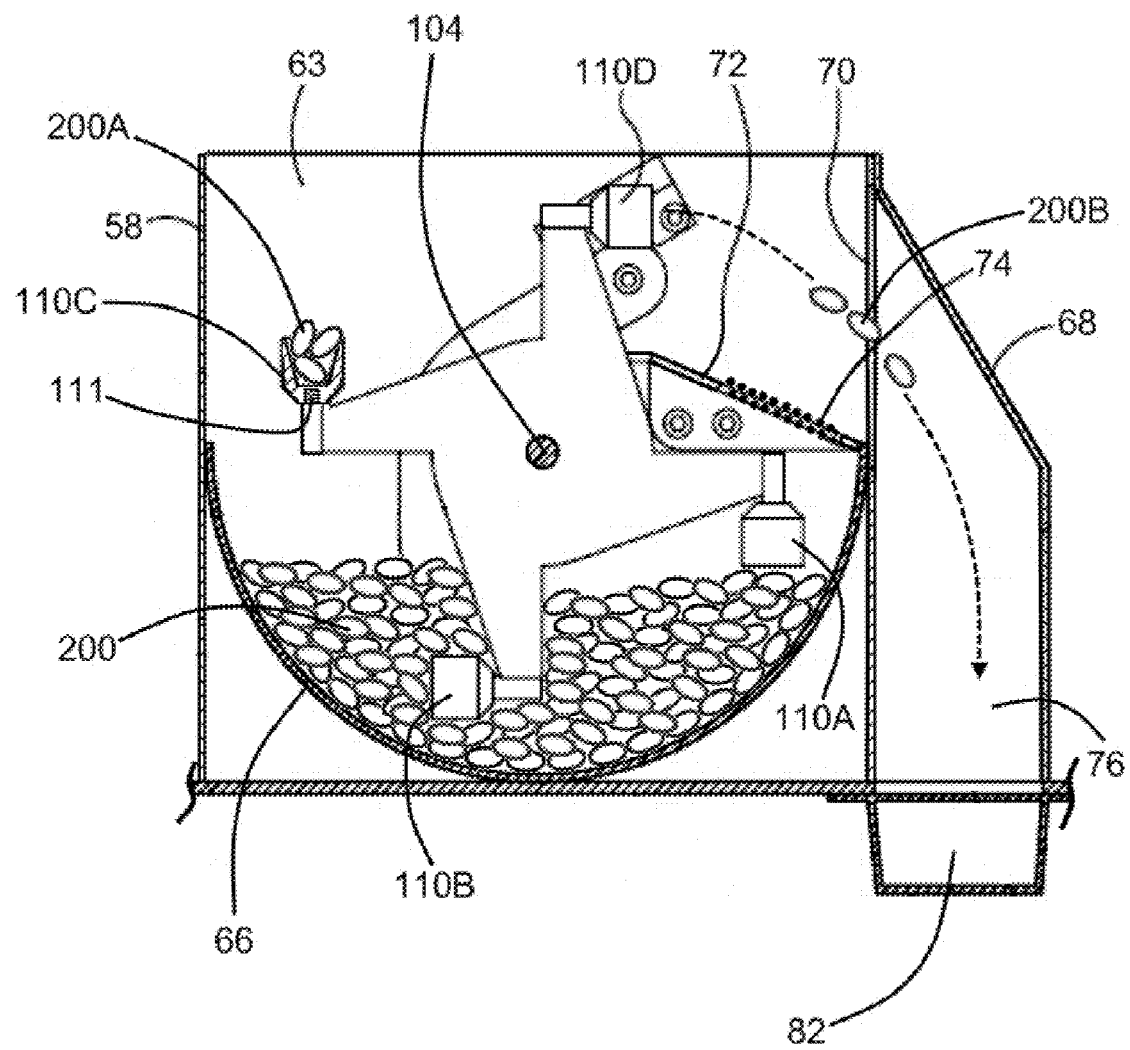
FIG. 7 redepicts FIG. 5, the view additionally showing seeds.

Referring simultaneously to FIGS. 1, 5, and 7, a seed wheel 108 is preferably rotatably mounted upon axle 104 within the interior of space 64 the seed bin. The axle 104 preferably laterally spans between and is rotatably journaled upon left and right bearings mounted up or positioned at the seed bin's left and right walls 63 and 65.

Referring in particular to FIG. 7, the seed wheel preferably presents four radially outwardly extending arms 108A, 108B, 108C, and 108D. Seeds cups 110A, 110B, 110C, and 110D are preferably correspondingly attached to the distal ends of the arms 108A-108D. As is shown in the sectional view of seed cup 110C, each seed cup is preferably removably and interchangeably attached by a helically threaded mounts 111. Such interchangeable mounts 111 constitute means for selective interchange of larger or smaller seed cups for facilitating varying seed sizes and for varying the size or number of seed planting clusters. Upon clockwise rotation of the seed wheel, the seed cups 110A-110D orbitally move through seed scooping positions, as represented by the lower positions of seed cups 110A and 110B, and thence orbitally move through seed dispensing positions which are represented by the depicted positions of seed cups 110C and 110D. The four armed and four cupped seed wheel 108 depicted in FIGS. 1, 5, and 7 is considered to be representative of other alternatively configured seed wheels such as three armed seed wheels, five armed seed wheels, or substantially disk shaped seed wheels. Such alternative configurations are considered to fall within the scope of the invention.

Referring simultaneously to FIGS. 1-5, a ground wheel 38 having a hub 42 is preferably rotatably mounted upon the seed bin by means of a second axle 40. In the preferred embodiment, the axle 40 is supported for rotatable motion by left and right bearings mounted or positioned at the seed bin's frame members 4 and 41, the axle 40 extending laterally through a bearing aperture within frame member 4, and through bearing aperture 43 within frame member 41.

Figure 3:
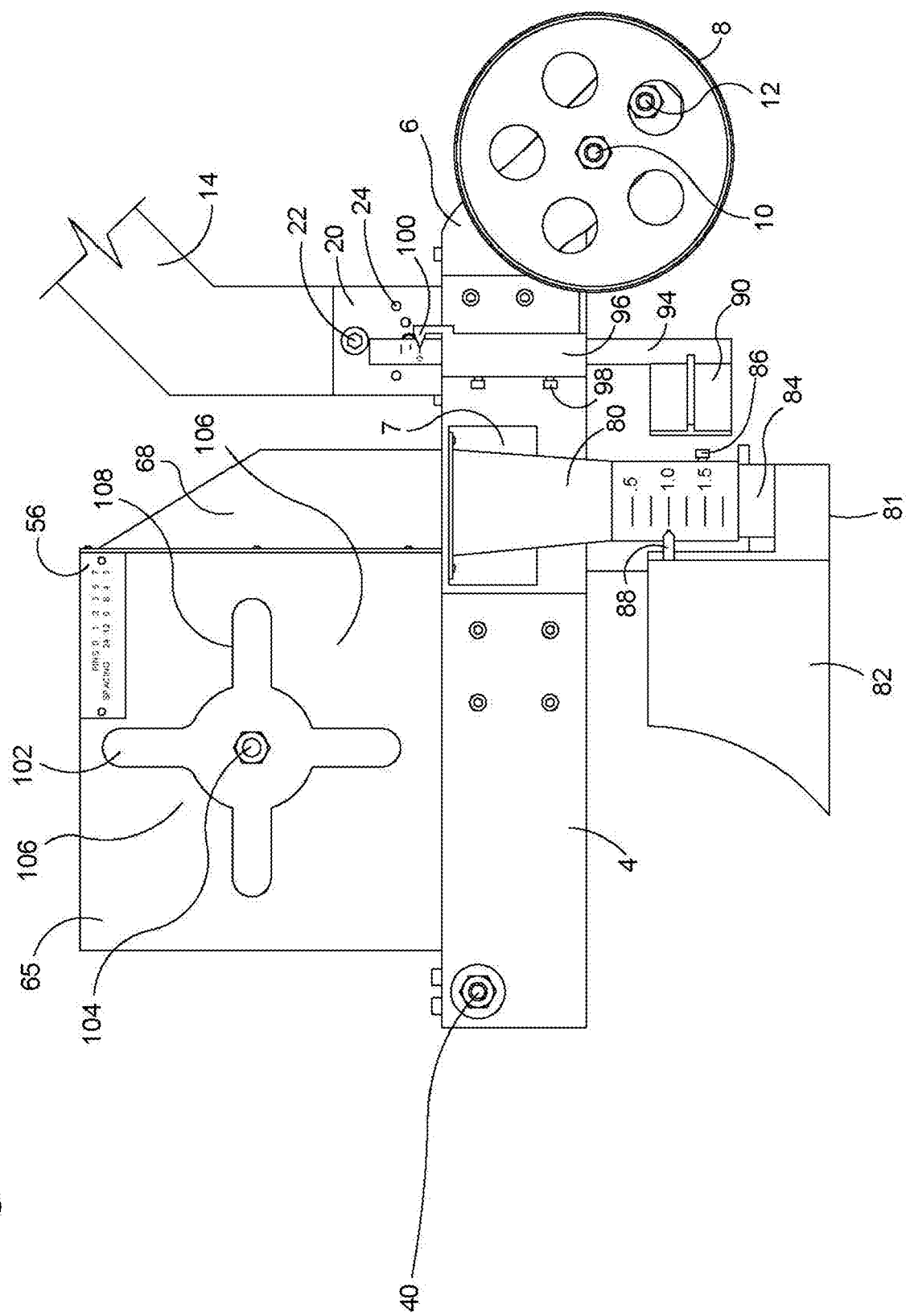
FIG. 3 redepicts FIG. 2, the view of FIG. 3 showing the garden seeder's geneva drive input wheel/ground wheel removed.

Referring simultaneously to FIGS. 1 and 2, the ground wheel 38 preferably dually functions for the provision of rolling carriage of the seeder, and for service as a geneva drive input wheel. The ground wheel's function as a geneva drive input wheel is facilitated by removable and interchangeable attachments of helically threaded drive pins 44, 46, 48, and 50. The drive wheel 38 is preferably spaced leftwardly from the seed bin while the drive pins preferably extend rightwardly from the hub 42 toward the seed bin. The distal ends of the drive pins 44-50 preferably terminate within the space between the ground wheel 38 and the seed bin to avoid mechanical interference with the seed bin's left wall 65. In operation of the inventive garden seeder 1, the drive pins 44-50 may successively contact and counter-rotate a geneva drive output wheel 102. The output wheel 102 is preferably mounted upon an outward extension of the first axle 104. Preferably, the geneva drive output wheel 102 presents four radially outwardly opening drive pin receiving slots 106. Such slots, in combination with each other, advantageously define four radially outwardly extending pin contact arms 108. As is depicted in FIGS. 2 and 3, the pin receiving slots 106 preferably are angularly widened to a "V" configuration in order to prevent any mechanically interfering contact between the drive pins 44-50 and the non-contact surfaces of the slots.

Referring in particular to FIG. 2, the ground wheel/geneva drive input wheel 38 preferably presents a single fixed drive pin 44 which associated with an inscribed legend "24". Reference Numeral 54 denotes all of such numerical inscribed legends appearing upon the outer surface of hub 42. The geneva drive input wheel/ground wheel 38 is preferably 24" in circumference. Accordingly, upon helically threaded removal of drive pins 46, 48, and 50 from their mounting sockets 52, and upon rolling motion of the wheel 38 over the ground, the fixed drive pin 44 contacts one of the four arms 108 of the geneva drive output wheel 102 upon each complete wheel rotation. Such contact results in, referring further to FIG. 7, a geneva drive actuated seed dispensing stroke of one of the seed cups 110A-110D upon every 24" of rolling travel. The hub inscribed legend "24" which associated with the fixed drive pin 44 is intended to denote a 24" seed spacing. Looking to the attached drive pin configuration guide plate 56, the spacing number "24" is associated thereon with zero pins. The zero pins notation upon the plate 56 instructs a gardener that zero attachable and detachable pins are to be attached to the wheel 38 to accomplish 24" seed spacing.

Looking further to the guide plate 56 depicted in FIG. 2, a desired 12" seed planting spacing is associated with attachment of one pin in addition to the fixed pin 44, such one pin being the threadedly attachable and detachable pin 48. Pin 48 is displaced 180° from pin 44, resulting in the desired 12" seed planting interval. The hub inscribed legend "12" which is associated with pin 48 corresponds with the 12" seed planting interval shown upon guide 56. Additional attachments of drive pins 46 and 48 within the two other helically threadedly pin receiving sockets 52 which are associated with the legend "6" result in a 6" seed planting interval, as is also shown upon guide plate 56. Further removably attachable drive pins may be provided for achieving the other seed spacings shown upon guide plate 56.

In operation of the instant inventive garden seeder and referring in particular to FIG. 7, a gardener may initially pour a quantity
of seeds 200 into the seed bin's interior 64, causing the seeds 200
to collect upon the curved floor 66. Referring further simultaneously to FIG. 2, upon every contact of a drive pin with one of the arms 108 of the geneva drive output wheel 102, each of the seed wheel's arms 108A-108D, along with their preferably removably and interchangeably attached seed cups 110A-110D, travel orbitally through approximately 90° of motion. Accordingly, upon one such drive pin contact, seed cup 110A will pass through seed scooping positions substantially corresponding with the depicted angular positions of the seed cups 110A and 110B. Upon that same drive pin contact, seed cup 110C (bearing seeds 200A which were scooped and loaded previously as the result of an immediately prior drive pin contact) pass through seed dispensing positions substantially corresponding with the depicted angular positions of cups 110C and 110D. Such orbital motion advantageously throws or dispenses seeds 200B toward output port 70 for outward dispensation to the ground through chute 76,82, the bore 76,82 of seed output chute 68,80. Such chute's extension preferably passes through an aperture 78 within frame member 2 and thence laterally through an aperture 7 within frame member 4.

Figure 6:
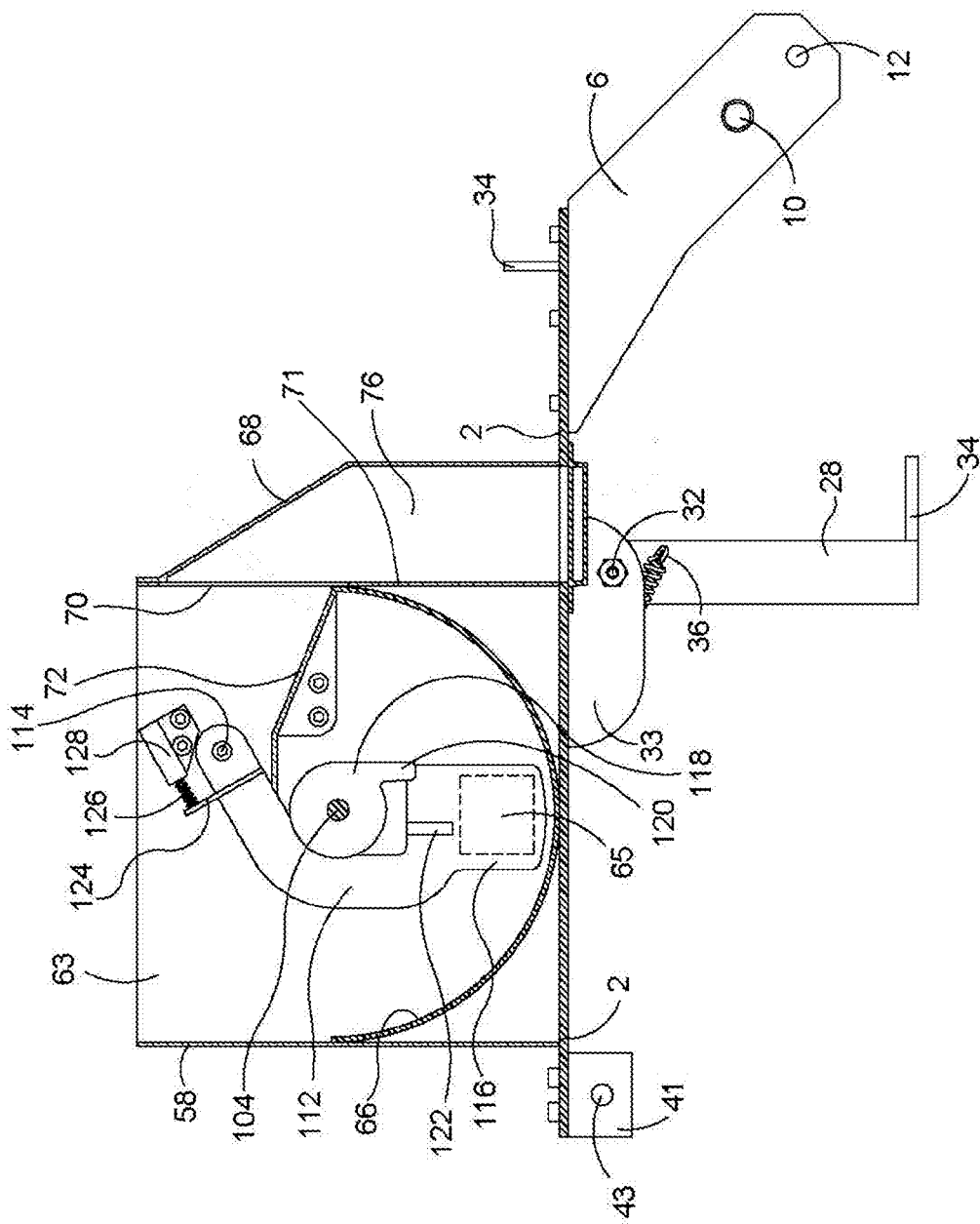
FIG. 6 is an alternative partial sectional view as indicated in FIG. 1.

Referring further to FIGS. 5-7, to protect from an eventuality wherein seeds 200B fall back into the body of collected seeds 200 rather than pass through port 70, a slotted seed dispensing ramp 72 is preferably fixedly mounted within the interior 64 of the seed bin. The slot within the ramp 72 is preferably fitted for rotatable passage therethrough of arms 108A-108B along with their distally attached seed cups 110A-110D. Such slot is necessarily laterally widened at its downslope end to facilitate rotating passage of the seed cups 110A-110B. In order to prevent undesirable seed passage through such widened slot section, slot spanning bristles or brushes 74 are preferably fixedly attached to the ramp 72.

Referring to FIG. 2, the lower output end of the seeder's output chute 68 and 80 may suitably have a plain lower opening for dispensation of seeds into a previously provided seed planting furrow. However, the instant inventive garden seeder preferably includes a seed drill attachment 82 which is slidably fitted to the lower output of the chute 68,80. Seeds passing through chute 68 and 80 emit from a lower port 81 at the lower extremity of the seed drill 82. Preferably, a set screw 86 is provided for selectively and adjustably affixing the seed drill 82 at a selected seed planting furrow depth, and a depth indicator gauge 88 is preferably provided.

Referring to FIGS. 2-4 and 6, the garden seeder's rearmost frame members 6 are preferably laterally paired and spaced for lateral support of an idler wheel axle 10 and a cross brace bar 12. The axle 10 extends through a bearing aperture 11 and the brace bar 12 extending through aperture 13. An idler wheel 8 is preferably rotatably mounted upon axle 10 for enhanced longitudinal stabilization of the seeder as it rollably moves along garden surfaces.

Figure 4:
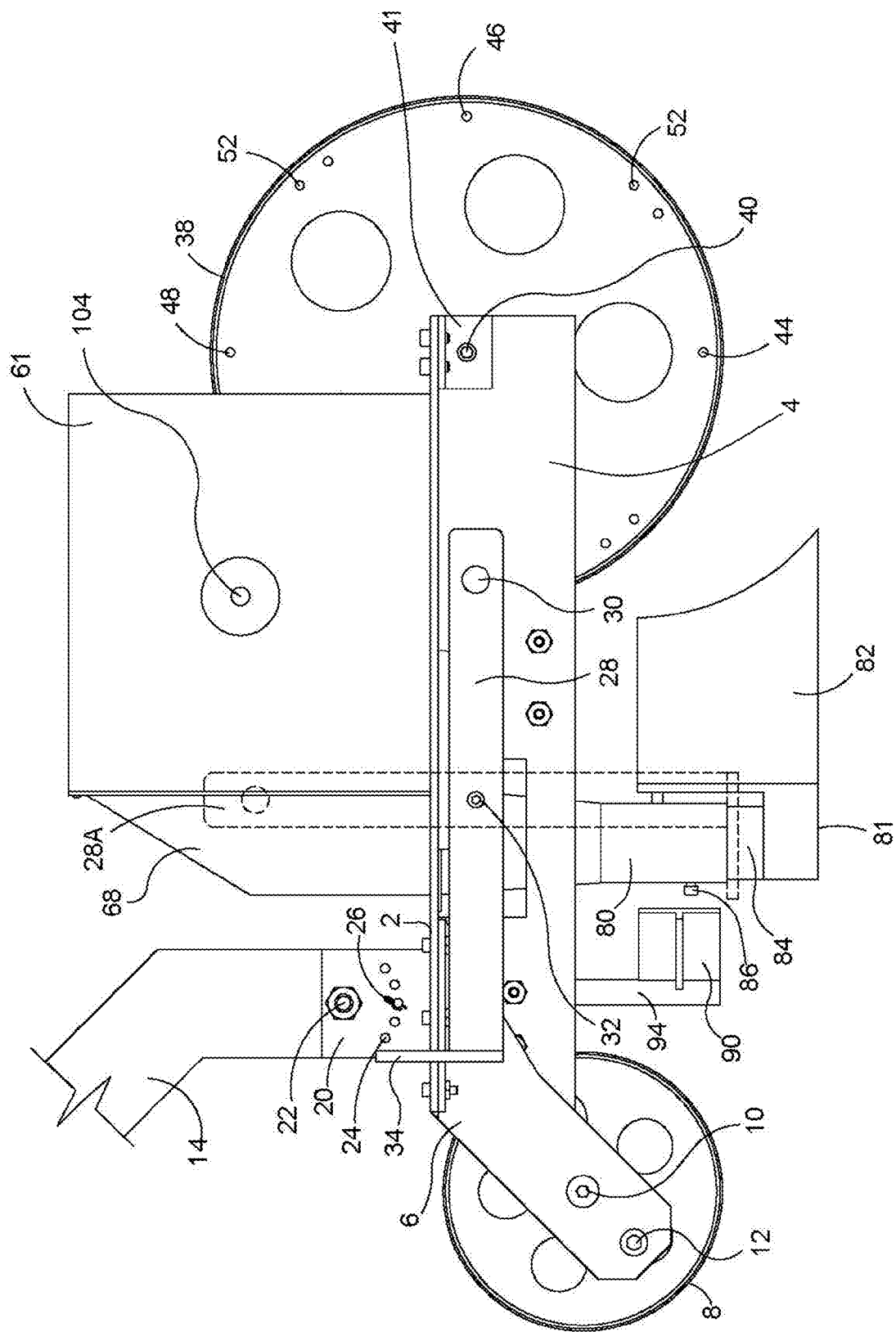
FIG. 4 is a partial right side view of the seeder of FIG. 1.

Referring simultaneously to FIGS. 4 and 5, in order to further stabilize the garden seeder while it is not in operation, a kick stand 28 is preferably provided. The kick stand 28 is preferably pivotally mounted upon a pivot pin 32 which extends from frame member 33. The kick stand 28 preferably has an enlarged foot 34 for increased ground contact area, and has a laterally extending foot contact lug 30 for facilitating foot actuated extensions and retractions of the kick stand 28 between the retracted position shown in solid lines upon FIG. 4, and the extended use position shown upon FIG. 5. A spring 36 spanning between frame member 33 and the kick stand 28 is preferably provided for, upon pivoting movement from the extended use position depicted in FIG. 5 to the retracted position depicted in FIG. 4, holding the kick stand 28 in such retracted positions. While the kick stand 28 is retracted, as shown in FIG. 4, lateral stability of the seeder is preferably provided by a gardener's grasp of a handle 14. Upon alternative extension of the kick stand 28, a stable triangular array of contact points is provided, such points being the ground wheel 38, the idler wheel 8, and the kick stand's foot 34.

Referring simultaneously to FIGS. 1 and 2, the handle 14 preferably presents an ergonomically configured pair of grips 16 and 18. The lower end of the handle 14 is preferably pivotally mounted upon a pivot pin 22 which extends between laterally paired clevis ears 20. Referring further to FIG. 4, the clevis ears 20 preferably present an array of radially positioned pin receiving eyes 24 which may selectively receive a lock pin 26. Selective use of the lock pin 26 in relation to the eyes 24 advantageously variably angularly positions the handle 14 and facilitates adjustment of the height of the handle's grips 16 and 18 over the ground.

Referring simultaneously to FIGS. 1 and 2, a curved dirt screed 90 is preferably attached to the garden seeder 1 as an auxiliary implement, the dirt screed 90 having a vertically extending mounting shaft 94. A laterally extending mounting flange 92 is preferably fixedly attached to frame 2, and the rightward or distal end of the mounting flange 92 preferably presents a shaft receiving slide sleeve 96. Set screws 98 may be utilized to selectively fix the shaft 94 within sleeve 92 at a desired dirt screeding depth as indicated by depth indicator 100. In operation, furrow dirt which is initially displaced by the seed drill blade 82 is beneficially redeposited within the furrow by screed 90, such redeposit of the dirt occurring immediately after dispensation of seeds within the furrow.

Referring to FIGS. 1, 5, and 6, in order to extend the length of operation of the seeder 1 between seed fillings, a reserve bin 61 is preferably provided, such bin having a partitioned interior space 60. The leftward wall of the reserve bin 61 preferably comprises the seed bin's rightward wall 63, and an outlet/inlet port 65 shown in dashed lines upon FIG. 6 opens the wall 63 to permit flows of seeds between the interior space 60 of the reserve bin 61 into the interior space 64 of the primary seed bin. In order to control such flow of seeds from the reserve bin 61 into the primary seed bin space 64, valve means are preferably provided. In the preferred embodiment, the valve means comprises a slide gate 116 which is fixedly attached to or formed wholly with a distal end of a pivot arm 112. The pivot arm 112 is preferably pivotally mounted by pivot pin 114 upon the seed bin's rightward wall 63. In order to hold the slide gate 116 in a normally closed position, as depicted in FIG. 6, a spring 126 supported by a spring mount 128 is preferably provided, such spring 126 biasing against a contact arm 124 which is fixedly mounted upon and extends from the pivot arm 112. In order to periodically actuate the gate valve 116 for opening port 65, a rotatable plate 118 having a contact pawl 120 is fixedly mounted upon the first axle 104 for rotation with such axle. Upon rotation of the axle (induced by the geneva drive operation described above), the pawl 120 periodically contacts a contact lug 122 which is fixedly attached to and extends leftwardly from the slide gate 116. Such contact forwardly pivotally moves both the pivot arm 112 and the slide gate 116, causing the slide gate 116 to move forwardly beyond the port 65. While port 64 is opened, a small quantity of seeds advantageously flow therethrough from space 60 into space 64. Upon each rotating passage of the pawl 120 beyond the contact lug 122, the spring 126 normally returns the pivot arm 112 and the slide gate 116 to their closed positions.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A seeder for planting seeds within a garden, the garden having a surface, the seeder comprising:
    (a) a seed bin having a seed storing end and having a seed dispensing end, the seed dispensing end overlying the seed storing end;
    (b) a seed wheel having a plurality of circumferentially attached seed dispensing cups;
    (c) a first axle rotatably mounting the seed wheel within the seed bin; the first axle facilitating orbital movements of the seed dispensing cups through seed scooping positions, and through seed dispensing positions, the seed dispensing positions overlying the seed scooping positions;
    (d) a ground wheel and a second axle rotatably mounting the ground wheel upon the seed bin, the ground wheel being positioned for rolling carriage of the seed bin over the garden's surface;
    (g) a geneva drive operatively interconnecting the seed wheel and the ground wheel, the geneva drive being adapted for, upon the rolling carriage, translating non-intermittent rotation of the ground wheel to intermittent rotation of the seed wheel, the intermittent rotation intermittently orbitally moving the seed dispensing cups through the seed scooping and seed dispensing positions; and
    (h) driving means connected operatively to the seed bin, the driving means being adapted to facilitate the rolling carriage of the seed bin.

2. The seeder of claim 1 wherein the geneva drive comprises a slotted output wheel and input wheel combination.

3. The seeder of claim 2 further comprising a plurality of drive pins, and drive pin mounting means, the drive pin mounting means attaching the drive pins to the input wheel.

4. The seeder of claim 3 wherein the drive pin mounting means is adapted to facilitate detachments and repositioning reattachments of the drive pins from and to the input wheel.

5. The seeder of claim 4 wherein the geneva drive's input wheel comprises the ground wheel, and wherein the drive pin mounting means comprises a plurality of pin mounts presented upon the ground wheel.

6. The seeder of claim 5 wherein the ground wheel's pin mounts are radially positioned with respect to the second axle in substantially evenly spaced radial increments.

7. The seeder of claim 6 wherein the substantially evenly spaced radial increments are selected from the group consisting of 180° increments, 120° increments, 90° increments, 60° increments, 45° increments, and 30° increments.

8. The seeder of claim 2 wherein the first axle outwardly protrudes from the seed bin, and wherein the operative interconnection of the seed wheel and the ground wheel mounts the geneva drive's slotted output wheel upon said outward protrusion.

9. The seeder of claim 8 wherein the geneva drive's slotted output wheel presents four substantially evenly radially spaced pin receiving slots.

10. The seeder of claim 9 wherein each of the output wheel's pin receiving slots are "V" configured, said "V" slots defining four pin contact arms.

11. The seeder of claim 1 wherein the seed bin has an upper opening, and wherein the seed bin's seed dispensing end comprises an output port, the output port further opening the seed bin.

12. The seeder of claim 11 further comprising a seed ramp having a lower end, the seed ramp being fixedly attached to the seed bin, the seed ramp being positioned so that the lower end of the seed ramp communicates with the output port.

13. The seeder of claim 12 further comprising a seed wheel slot extending through the seed ramp, the seed ramp being further positioned so that the seed cups' orbital movements may successively pass through the seed wheel slot.

14. The seeder of claim 11 further comprising a seed dispensing chute having an input end and an output end, the seed dispensing chute's input end communicating with the seed bin's output port.

15. The seeder of claim 14 further comprising a seed drill operatively connected to the seed bin for opening a planting furrow within the garden's surface in advance of the seed chute's output end.

16. The seeder of claim 1 wherein the seed bin has an upper seed receiving opening, wherein the seed bin is further opened by an input port, and further comprising a reserve bin mounted upon the seed bin, the reserve bin having an output port, the reserve bin's output port communicating with the seed bin's input port.

17. The seeder of claim 16 further comprising valve means connected operatively to the seed bin, the valve means being adapted for alternatively permitting and resisting flows of seeds through the seed bin's input port.

18. The seeder of claim 17 wherein the valve means comprises a slide gate having open and closed positions, and further comprising spring means connected operatively to the slide gate, the spring means normally moving the slide gate to the closed position.

19. The seeder of claim 18, further comprising a contact lug and actuator pawl combination, the contact lug being fixedly attached to the slide gate and the actuator pawl being fixedly attached to the first axle, the contact lug and actuator pawl combination being adapted for, upon rotation of the first axle, successively moving the slide gate to the open position and releasing the slide gate for spring biased movement to the closed position.

20. The seeder of claim 1 wherein seed bin comprises a frame, and wherein the driving means comprises a handle fixedly attached to and extending upwardly from the seed bin's frame.

21. The seeder of claim 20 further comprising an idler wheel mounted upon the seed bin's frame, the idler wheel being positioned for further rolling carriage of the seed bin over the garden's surface.

22. The seeder of claim 21 further comprising a stabilizing member fixedly attached to the seed bin's frame, the stabilizing member being positioned for providing, in combination with the ground and idler wheels, a triangular array of stabilizing ground contacts.

23. The seeder of claim 22 wherein the stabilizing member comprises a pivoting kick stand.

* * * * *